United States Patent [19]

Kim

[11] Patent Number: 5,493,428
[45] Date of Patent: Feb. 20, 1996

[54] OPTICAL EXPOSURE SYSTEM FOR COLOR VIDEO PRINTER WITH THREE GROUPS OF LINES OF LIQUID CRYSTAL ELEMENTS, ONE GROUP PER COLOR

[75] Inventor: Jee H. Kim, Seoul, Rep. of Korea

[73] Assignee: Goldstar Co. Ltd., Seoul, Rep. of Korea

[21] Appl. No.: 863,824

[22] Filed: Apr. 6, 1992

[30] Foreign Application Priority Data

Apr. 6, 1991 [KR] Rep. of Korea ............... 5542/1991

[51] Int. Cl.⁶ ............... G02F 1/1343; G02F 1/1335; G09G 3/36
[52] U.S. Cl. ............... 359/54; 359/59; 359/68; 345/89
[58] Field of Search ............... 359/68, 59, 54; 345/89

[56] References Cited

U.S. PATENT DOCUMENTS

| 4,410,887 | 10/1983 | Stolov et al. | 359/88 |
|---|---|---|---|
| 5,056,893 | 10/1991 | Holz et al. | 359/54 |
| 5,066,109 | 11/1991 | Kuratate et al. | 359/54 |
| 5,121,235 | 6/1992 | Matino et al. | 359/68 |
| 5,157,524 | 10/1992 | Dijon et al. | 359/87 |
| 5,208,689 | 5/1993 | Hartmann et al. | 359/54 |
| 5,223,960 | 6/1993 | Kim | 359/59 |
| 5,317,437 | 5/1994 | Katakura | 359/68 |
| 5,319,480 | 6/1994 | McCartney | 359/59 |

FOREIGN PATENT DOCUMENTS 0431795  6/1991  European Pat. Off. ............... 359/68

*Primary Examiner*—Anita Pellman Gross
*Attorney, Agent, or Firm*—Fliesler, Dubb, Meyer & Lovejoy

[57] ABSTRACT

A multi-flow type optical exposure system for a color video printer. The system comprises a LCD part 10 comprising, by red(R), green(G) and blue(B) color lines, a plurality of liquid crystal element lines, and a color filter part 10 comprising, by the red(R), green(G) and blue(B) lines, a plurality of color filters corresponding to the R, G and B color lines of the LCD pan 10, respectively, the color filter part having different transmissivities by the lines of each color R, G, B. The color filter part 20 has a transmissivity ratio by the R, G and B lines described as $1/K^0:1/K^1:---:1/K^{n-1}$, wherein K is the number of gradations of each liquid crystal element. The present invention provides advantage in that it increases the number of color gradations even though it uses conventional inexpensive liquid crystal elements of 8 gradations, thereby improving the image quality and reducing the manufacturing cost of the color video printer.

7 Claims, 3 Drawing Sheets

OPTICAL EXPOSURE SYSTEM FOR COLOR VIDEO PRINTER WITH THREE GROUPS OF LINES OF LIQUID CRYSTAL ELEMENTS, ONE GROUP PER COLOR

BACKGROUND OF THE INVENTION

Field of the Invention

The present invention relates in general to a color video printer, and more particularly to an optical exposure system for such a color video printer which uses conventional inexpensive liquid crystal elements of 8-gradation transmissivities and increases the number of color gradations, thus improving the image quality.

Description of the Prior Art

Conventionally, color video printers are generally provided with an optical exposure system for recording or printing an image on a photosensitive medium by producing an optical image for an electric image signal and exposing the photosensitive medium to a light of the optical image. There have been known several types of optical exposure systems for producing the optical image for the electric image signal. Recently, a fiber optics liquid crystal display (FOLCD) package, which converts the electric image signal into the optical image utilizing a liquid crystal television technique, has been developed and rapidly is becoming the generally used optical exposure system.

The known FOLCD package generally comprises a liquid crystal display (LCD) panel for producing the optical image for the electric image signal synchronously with a scanning signal, In addition, at the back and at the front of the LCD panel, respectively, them are provided a back light source for irradiating a light to the LCD panel part in order to expose the photosensitive medium to the optical image produced by the LCD panel, and a fiber optics face plate having a screen for exposing the photosensitive medium to the optical image of the LCD panel.

With reference to FIG. 1, the LCD panel of the known optical exposure system generally comprises a LCD part 1 for producing the optical image for the electric image signal by red(R), green(G) and blue(B) color lines and a color filter part 2 which adheres to the LCD part 1 in order to bring out the R, G and B colors.

As shown in FIG. 2, the equivalent circuit of the LCD part 1 is constructed by the R, G and B color lines such that three groups of liquid crystal elements $(L_{R1}-L_{Rh})$, $(L_{G1}-L_{Gh})$ and $(L_{B1}-L_{Bh})$ are arranged corresponding to the R, G and B lines, each common electrode terminal of the above liquid crystal elements $(L_{R1}-L_{Rh})$, $(L_{G1}-L_{Gh})$ and $(L_{B1}-L_{Bh})$ is grounded, and the signal electrode terminals of the liquid crystal elements $(L_{R1}-L_{Rh})$, $(L_{G1}-L_{Gh})$ and $(L_{B1}-L_{Bh})$ are connected to the source terminals of three groups of thin film transistors $(T_{R1}-T_{Rh})$, $(T_{G1}-T_{Gh})$ and $(T_{B1}-T_{Bh})$, respectively. Additionally, the gates of the thin film transistors $(T_{R1}-T_{Rh})$, $(T_{G1}-T_{Gh})$ and $(T_{b1}-T_{Bh})$ are connected to the R, G and B gate lines $G_R$, $G_G$, and $G_B$ by the R, G and B lines, respectively. The drain terminals of the thin film transistors $(T_{R1}, T_{G1}$ and $T_{B1})$, $(T_{R2}, T_{G2}$ and $T_{B2})$, - - - $(T_{Rh}, T_{Gh}$ and $T_{Bh})$ are connected, by pixels, to the drain lines $D_1$, $D_2$, - - - $D_h$, respectively.

On the other hand, the color filter part 2 comprises R, G and B color filters corresponding to the three groups of liquid crystal elements $(L_{R1}-L_{Rh})$, $(L_{G1}-L_{Gh})$ and $(L_{B1}-L_{Bh})$, respectively.

The operation of the FOLCD package having the above construction will be described as follows.

If the horizontal scanning signals are applied to the R, G and B gate lines $G_R$, $G_G$, and $G_B$ at predetermined periods and then the signal voltages corresponding to the pixels are sequentially applied to the drain lines $D_1$, $D_2$, - - - , $D_h$ synchronously with the horizontal scanning signals applied to the R, G and B gate lines, the thin film transistors $(T_{R1}, T_{G1}$ and $T_{B1})$, $(T_{R2}, T_{G2}$ and $T_{B2})$, - - - $(T_{Rh}, T_{Gh}$ and $T_{Bh})$ are turned on, thereby applying the signal voltages corresponding to the pixels to the liquid crystal elements $(L_{R1}-L_{Rh})$, $(L_{G1}-L_{Gh})$ and $(L_{B1}-L_{Bh})$, respectively. In accordance, the liquid crystal elements $(L_{R1}-L_{Rh})$, $(L_{G1}-L_{Gh})$ and $(L_{B1}-L_{Bh})$ maintain the respective signal voltages, having been applied thereto, for one period by means of a condenser. Therefore, the transmissivities of the liquid crystal elements $(L_{R1}-L_{Rh})$, $(L_{G1}-L_{Gh})$ and $(L_{B1}-L_{Bh})$ are varied in proportion to the signal voltages applied thereto.

At this time, the back light source irradiates the light to the LCD panel. In result, the LCD panel makes the quantity of light which is transmitted therethrough to be varied in proportion to the signal voltages due to the respective transmissivities of the liquid crystal elements $(L_{R1}-L_{Rh})$, $(L_{G1}-L_{Gh})$ and $(L_{B1}-L_{Bh})$. The transmitted light is then applied to the color filter pan 2 in order to cause the R, G and B colon to be brought out thereby. Thereafter, the R, G and B color lights from the color filter pan 2 are transmitted through the fiber optics face plate, thereby causing the photosensitive medium to be exposed thereto.

As a result, it is possible to expose the photosensitive medium to the R, G and B color lights by using the fiber optics face plate in order to cause the color image to be transmitted onto the photosensitive medium and to print the color image of the photosensitive medium. Here, in case of using a silver dry-paper-type photosensitive medium, the photosensitive medium is exposed to the optical color image at the optical exposure system, then heated itself by a heat fixing system in order to fix the color image thereof. However, in case of using a cycolor type photosensitive medium such as a cycolor film, the photosensitive medium is exposed to the optical color image at the optical exposure system, then compressed with a receiver paper by a developing system in order to develop the color image thereof onto a receiver paper which is then heated by the heat fixing system in order to fix the color image thereof.

In the above-mentioned conventional optical exposure system for a color video printer, the number of color gradations of the printed image is substantially influenced by the number of gradations of transmissivities of the liquid crystal elements. Recently, the number of gradations of transmissivities of the liquid crystal elements have gradually increased as the technique for manufacturing the liquid crystal elements have advanced. However, the increase in the number of gradations of transmissivities of the liquid crystal elements is obliged to be limited in view of the present technical level. Additionally, the higher the number of gradations of transmissivities, the more the manufacturing process of the liquid crystal element is accompanied with difficulty, thereby causing the manufacturing cost to substantially increase. As a result, it is known that the liquid crystal elements having 8-gradation transmissivities are appropriate in view of the present level of the technique for manufacturing the liquid crystal element. Thus, 8-gradation level transmissivities are widely used. Accordingly, the known optical exposure system for the color video printer generally comprises the liquid crystal elements of 8-gradation transmissivities and thus the transmissivity of the color filter pan is obliged to be fixed at a predetermined level.

It is known that the human eyes can recognize the colors of the printed image as the natural colors without a burden only in case of a color image of at least 64 color gradations. As a result, a personal color video printer conventionally is required to have at least 64 color gradations, and a high-class color video printer is required to have at least 256 color gradations.

The known optical exposure system for color video printers provided with the conventional liquid crystal elements of 8-gradation transmissivities can vary the transmissivities of the liquid crystal elements by 8 gradations for each color R, G, B. However, the number of gradations resulting from the variance of the transmissivities of the liquid crystal elements of this system is substantially deficient in providing the desired natural color, thereby causing the printer to provide a bad image quality. In an effort to overcome the above-mentioned bad image quality owing to the limited gradations, the optical exposure system may be provided with the liquid crystal elements having an increased number of gradations of transmissivities, but this type of optical exposure system has a disadvantage of requiring a difficult manufacturing process and also an expensive manufacturing cost. In addition, them has been proposed another type of optical exposure system having a multi-layer type LCD panel resulting from arranging a plurality of liquid crystal elements of 8-gradation transmissivities on at least 2 layers so as to increase the number of gradations of transmissivities. However, this type of optical exposure system has disadvantages because of the difficulty in matching the signal voltages to the quantity of optical exposure light and also because of a complex construction.

SUMMARY OF THE INVENTION

It is, therefore, an object of this invention to provide an optical exposure system for a color video printer which is able to increase the number of color gradations thereof over a predetermined number, thereby improving the image quality of the printed image, even though it efficiently uses conventional inexpensive liquid crystal elements of 8-gradation transmissivities.

The above-mentioned object of the present invention can be accomplished by providing an optical exposure system for a color video printer comprising: a LCD part comprising, by red(R), green(G) and blue(B) color lines, a plurality of liquid crystal element lines, respectively; and a color filter part comprising, by the red(R), green(G) and blue(B) lines, a plurality of color filters corresponding to the R, G and B color lines of said LCD part 10, respectively, said color filter part having different transmissivities by the lines of each color R, G, B.

The color filter part has a transmissivity ratio by the R, G and B lines described as $1/K^0 : 1/K^1 : \text{---} : 1/K^{n-1}$, wherein K is the number of gradations of each liquid crystal element.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
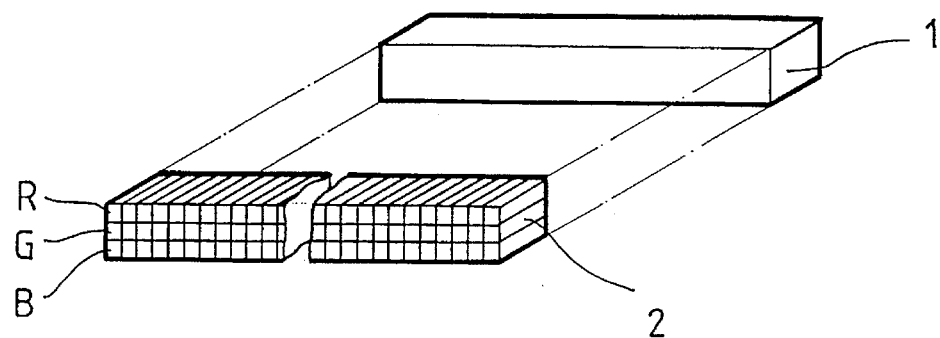
FIG. 1 is a schematic perspective view of a liquid crystal display panel of a conventional fiber optics liquid crystal display package for a color video printer.
Figure 2:
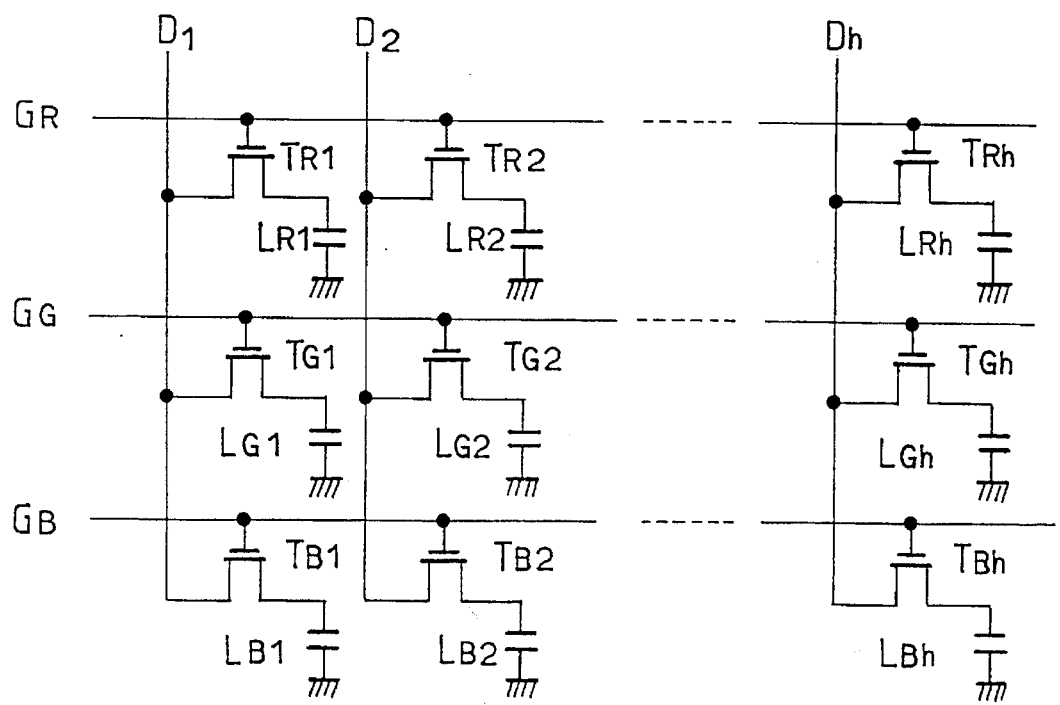
FIG. 2 is an equivalent circuit diagram of the liquid crystal display panel of FIG. 1.
Figure 3:
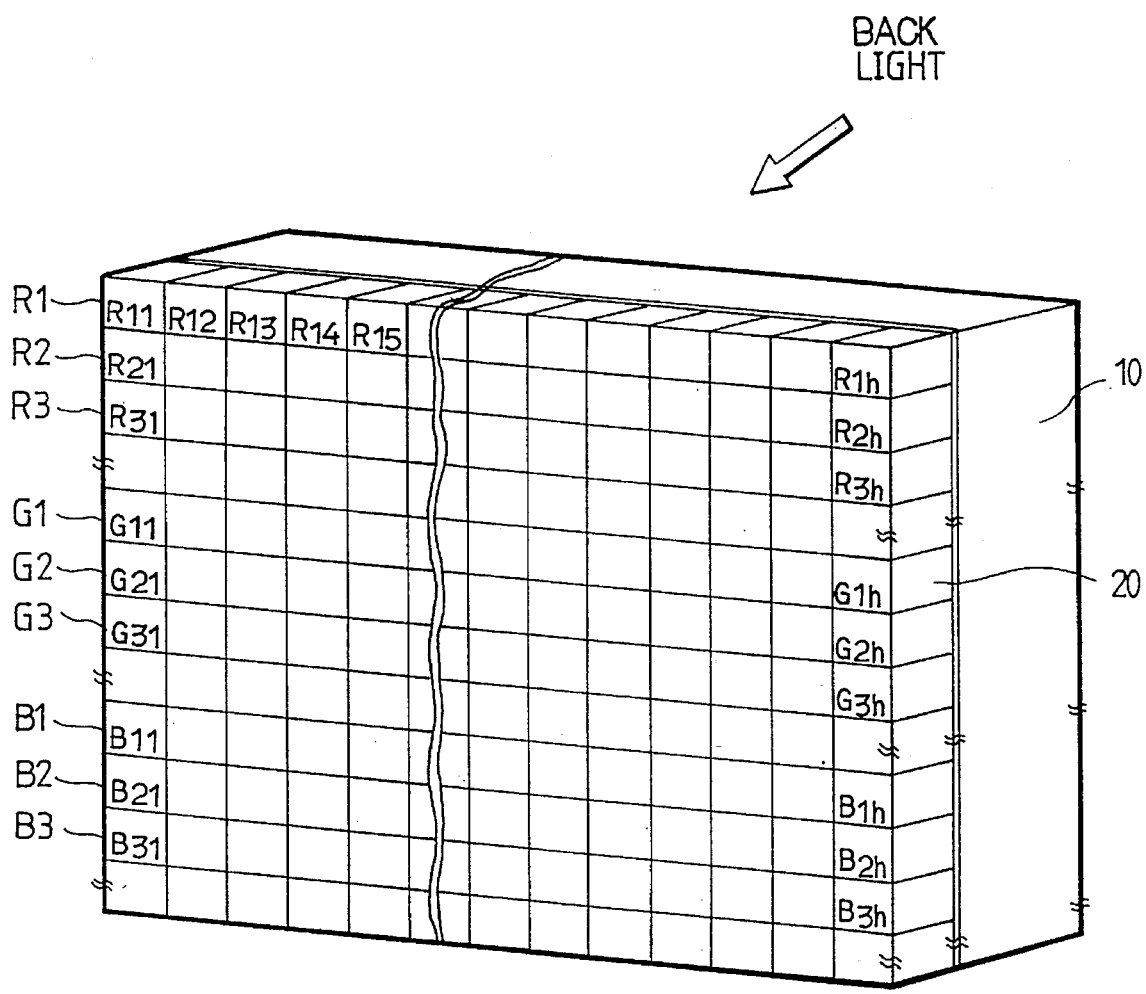
FIG. 3 is a schematic perspective view of a multi-flow type liquid crystal display panel of an optical exposure system for a color video printer in accordance with the present invention.

Referring to FIG. 3 showing a multi-flow type liquid crystal display (LCD) panel of an optical exposure system for a color video printer according to the present invention, the LCD panel includes a LCD part 10 comprising, by the red(R), green(G) and blue(B) lines, a plurality of liquid crystal clement lines, respectively. The LCD panel is additionally provided with a color filter part 20 comprising, by the red(R), green(G) and blue(B) lines, a plurality of color filters (R1, R2, - - - ), (G1, G2, - - - ), and (B1, B2, - - - ) corresponding to the R, G and B lines of the LCD part 10, respectively.

Here, the LCD elements of the LCD part 10 are conventional LCD elements of 8-gradation transmissivities and the color filter part 20 is constructed of the color filters having different transmissivities by the lines of each color R, G, B.

On the other hand, the color filter part 20 is constructed such that the transmissivity ratio thereof by the R, G and B lines can be described as follows:

$1K^0 : 1/K^1 : \text{---} : 1/K^{n-1}$ wherein K is the number of gradations of each liquid crystal element.

Here, if each liquid crystal element is a liquid crystal element of 8 gradations, the number K of gradations of the liquid crystal element will be "8".

The operation of the optical exposure system of the above construction will be described as follows.

As described above, this optical exposure system is provided with the multi-flow type LCD panel which includes the LCD part 10 comprising, by the red(R), green(G) and blue(B) lines, the plurality of liquid crystal element lines, respectively, and the color filter part 20 comprising, by the red(R), green(G) and blue(B) lines, the plurality of color filters (R1, R2, - - - ), (G1, G2, - - - ), and (B1, B2, - - - ) corresponding to the R, G and B lines of the LCD part 10, respectively. Also, the liquid crystal elements of the LCD part 10 comprise conventional liquid crystal elements of 8-gradation transmissivities and the color filter part 20 is constructed of the color filters having the different transmissivities by the lines of each color R, G, B, Conventionally, the optical exposure system having the multi-flow type LCD panel makes one horizontal line of a photosensitive medium to be exposed to the R, (} and B color lights by several times for each color light, respectively, thereby reducing the required time for the optical exposure process and thus accomplishing a high speed printing. In the same manner, the optical exposure system of this invention including the color filter part 20 comprising the color filters having the different transmissivities by the lines makes one horizontal line of a photosensitive medium to be repeatedly exposed to the R, G and B color lights, respectively. At this time, the value resulting from multiplying the gradation data by the gain in consideration of the transmissivity of each corresponding color filter is applied to an equivalent circuit of the LCD panel as a liquid crystal driving signal value. That is, when this optical exposure system repeatedly exposes the one horizontal line of the photosensitive medium to the R, G and B color lights several times for each color light, it increases the number of color gradations by virtue of the different transmissivities of the color filters for each color light R, G, B.

For example, if the liquid crystal elements of 8-gradation transmissivities and three color filters having different transmissivities are used for each color R, G, B, the transmissivity ratio of the color filters will be 1:⅛:1/64.

If the values resulting from a 8-step fixing of a signal value for the liquid crystal element corresponding to each color filter are $X_1$, $X_2$ and $X_3$, the number of color gradations will be $X_1/8 + X_2/64 + X_3/512$, that is, the number of $(64X_1 + 8X_2 + X_3)/512$.

As a result, if a data value for driving a subject pixel is X, and the eight-step fixing values $X_1$, $X_2$ and $X_3$ are selected in order to satisfy the equation $X = 64X_1 + 8X_2 + X_3$, it is possible to provide a color expression of 512 color gradations. Furthermore, if the data value X is a 9 bit data value, it is possible to provide a color expression of many more color gradations such that the least significant bit (LSB) of the 9 bit data value is effective.

Here, if each liquid crystal element has a transmissivity of a predetermined number of gradations, for example, 8 gradations, and the data value for R color expression of the subject pixel is X and also the eight-step fixing value of the data value X is $X_x$, the quantity of optical exposure fight in case of the optical exposure by using the liquid crystal element of 8 gradations, that is, the quantity of light transmitted through the liquid crystal element will be a value of $X_x/8$.

Therefore, the method for calculating the eight-step fixing values $X_1$, $X_2$ and $X_3$, for example, in case of assuming that the data value of R color light exposure for the subject pixel of an optical exposure system of 512-gradation expression is "363", can be described as follows.

As the value resulting from dividing "363" by "64" is a value between "5" and "6", the first fixing value $X_1$ is selected as "5". On the other hand, as the value resulting from multiplying "64" by "5" is "320", the value "320" is subtracted from the data value "363" in order to obtain the result value "43". Also, as the value resulting from dividing the result value "43" by the number of gradations "8" is a value between "5" and "6", the second fixing value $X_2$ is selected as "5". In addition, the number of gradations "8" is multiplied by "5" in order to obtain a result value "40" which is then subtracted from the value "43", thereby obtaining a result value "3". As a result, the third fixing value $X_3$ is selected as "3".

In accordance, the liquid crystal element corresponding to the subject pixel and being disposed at the first R line is driven by a value of ⅝ in offer to obtain a quantity of optical exposure light of 320/512. The liquid crystal element corresponding to the subject pixel and being disposed at the second R line is driven by a value of ⅝ in offer to obtain a quantity of optical exposure light of 43/512. In addition, the liquid crystal element corresponding to the subject pixel disposed at the third R line is driven by a value of ⅜ in order to obtain a quantity of optical exposure light of 3/512.

That is, the subject pixel of the three LCD lines are driven by the values ⅝, ⅝ and ⅜, respectively. As the color filters R1, R2 and R3 have the different transmissivities, the quantity of optical exposure light is totally 363/512.

Figure 4A:
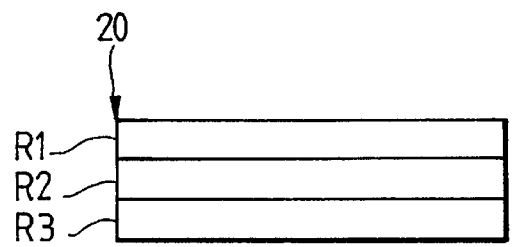
FIGS. 4A to 4C are views for illustrating the operation of the multi-flow type liquid crystal display panel of FIG. 3, respectively.
Figure 4B:
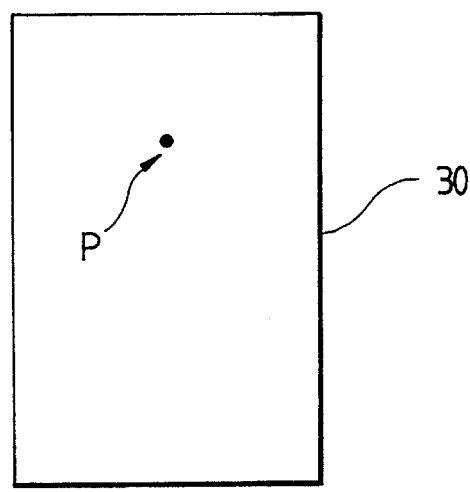
Figure 4C:
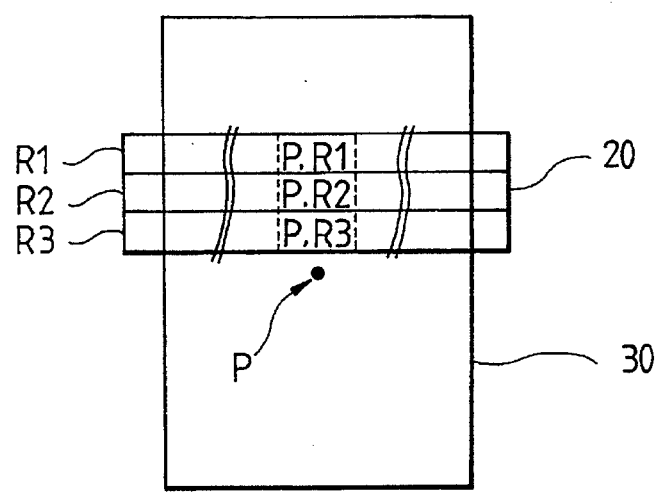

FIGS. 4A to 4C illustrate the operation of the multi-flow type liquid crystal display panel of this invention, respectively. As described in the drawings, if the R color data value of a certain pixel point P of the photosensitive medium 30 is "363", the color gradations of the liquid crystal elements corresponding to the respective R lines (R1 to R3) will be $X_1 = 5$, $X_2 = 5$ and $X_3 = 3$ in accordance with the above-mentioned calculating method. In result, the transmissivities of the liquid crystal elements are determined in accordance with the magnitude of the values $X_1$, $X_2$ and $X_3$.

In operation, the photosensitive medium 30 is normally fed under the condition of contacting with the optical exposure system. When the point P of the photosensitive medium 30 reaches a position corresponding to the pixel (P, R1) of the first line R1 of R color filters, the liquid crystal elements are driven by the value $X_1$ in order to provide the predetermined quantity of optical exposure light $64*X_1$. On the other hand, when the point P of the photosensitive medium 30 reaches a position corresponding to the pixel (P, R2) of the second line R2 of R color filters, the liquid crystal elements are driven by the value $X_2$ in order to provide the predetermined quantity of optical exposure light $8*X_2$. Thereafter, when the point P of the photosensitive medium 30 reaches a position corresponding to the pixel (P, R3) of the second line R3 of R color filters, the liquid crystal elements are driven by the value $X_3$ in order to provide the predetermined quantity of optical exposure $1*X_3$.

As a result, the point P of the photosensitive medium 30 is totally exposed to the R color light by the total quantity of optical exposure light of $64*5 + 8*5 + 3 = 363$. Sequentially, the point P is repeatedly exposed to the G and B color lights under the same manner as that of the R color light.

As described above, the present invention provides a multi-flow type optical exposure system comprising a fiber optics liquid crystal package including a multi-flow type LCD panel which uses conventional liquid crystal elements of 8 gradations, is provided with color filters having the different transmissivities, thereby providing a gradation expression exceeding at least 64 gradations. As a result, the present invention provides an advantage in that it improves the image quality of the printed image due to the increase of the number of color gradations and also reduces the manufacturing cost of the color video printer due to use of conventional inexpensive liquid crystal elements of 8 gradations.

Although the preferred embodiments of the present invention have been disclosed for illustrative purpose, those skilled in the art will appreciate that various modifications additions and substitutions are possible, without departing from the scope and spirit of the invention as disclosed in the accompanying claims.

What is claimed is:

1. An optical exposure system for a color video printer comprising:

a liquid crystal part including first, second and third groups of liquid crystal elements, each group including a plurality of lines of liquid crystal elements; and a color filter part including red(R), green(G) and blue(B) color filters corresponding to the first, second and third groups, respectively, each of said color filters having a plurality of lines of filter elements corresponding to said plurality of lines of liquid crystal elements, respectively, each of said lines of liquid crystal elements having different transmissivities.

2. An optical exposure system according to claim 1, wherein said plurality of lines of filter elements include "n" lines having transmissivity ratios $1/K^0 : 1/K^1 : - - - : 1/K^{n-1}$; and wherein K is the number of gradations of each liquid crystal element and "n" and K are integers.

3. An optical exposure system for exposing an image formed of pixels comprising:

a liquid crystal display including a liquid crystal part and a color filter part where, said liquid crystal part has a first liquid crystal group, a second liquid crystal group and a third liquid crystal group, where each liquid crystal group includes a plurality of liquid crystal elements, each of said liquid crystal elements having a common scanning line input for turning on the liquid crystal element, and each of said liquid crystal elements having an independent video input for controlling the transmissivity of the liquid crystal element, said color filter part has red, green and blue filter portions for filtering light from said first liquid crystal group, said second liquid crystal group and said third liquid crystal group, respectively, each of said filter portions including a plurality of filter elements having different transmissivities, said plurality of filter elements aligned to receive light from said plurality of liquid crystal elements, light source means disposed to transmit light through the liquid crystal elements and the aligned filter elements of the liquid crystal display to form an image having, for each pixel, an intensity of red, green and blue light components proportional to the transmissivities of said first group, said second group and said third group of liquid crystal elements, respectively, and of said red, green and blue filter portions, respectively.

4. An optical exposure system according to claim 3, wherein each of the red, green and blue color filter portions has "n" color filter elements having transmissivity ratios $1/K^0:1/K^1: - - - : 1/K^{n-1}$ wherein K is the number of gradations of each liquid crystal element and where K and "n" are integers.

5. An optical exposure system of claim 4 wherein each of said groups has "n" liquid crystal pixel elements having transmissivities controlled by video inputs $X_1, X_2, \ldots, X_n$ whereby the combined transmissivity X of the liquid crystal pixel elements and the filter elements with C possible gradations is .

6. An optical exposure system according to claim 5 wherein "n" equals 3, K equals 8 and C equals 512, whereby $X=(64X_1+8X_2+X_3)/512$.

7. An optical exposure system for exposing an image formed of pixels comprising:

a liquid crystal display including a liquid crystal part and a color filter part where, said liquid crystal part has a first liquid crystal group, a second liquid crystal group and a third liquid crystal group, where each liquid crystal group includes a plurality of liquid crystal elements, each of said liquid crystal elements having a common scanning line input for turning on the liquid crystal element, and each of said liquid crystal elements having video input for controlling the transmissivity of the liquid crystal element, said color filter pan has red, green and blue filter portions for filtering light from said first liquid crystal group, said second liquid crystal group and said third liquid crystal group, respectively, each of the red, green and blue color filter portions having "n" color Filter elements having transmissivity ratios $1/K^0:1/K^1: - - - :1/K^{n-1}$ wherein K is the number of gradations of each liquid crystal element and where K and "n" are integers, said plurality of filter elements aligned to receive light from said plurality of liquid crystal elements, light source means disposed to transmit light through the liquid crystal elements and the filter elements of the liquid crystal display to form an image having an intensity of red, green and blue components proportional to the transmissivities of said first group, said second group and said third group of liquid crystal elements, respectively and of said red, green and blue filter portions, respectively.

* * * * *